July 20, 1965    A. KOTT ETAL    3,196,044
MEANS FOR PRODUCING COMPACTED STARCH
Original Filed Dec. 2, 1959    4 Sheets-Sheet 4

INVENTORS.
Arthur Kott &
BY Richard M. Olson, 3,196,044
MEANS FOR PRODUCING COMPACTED STARCH
Arthur Kott, Oak Forest, and Richard M. Olson, North Riverside, Ill., assignors to Corn Products Company, New York, N.Y., a corporation of Delaware
Original application Dec. 2, 1959, Ser. No. 856,730, now Patent No. 3,119,719. Divided and this application Sept. 11, 1962, Ser. No. 222,815
6 Claims. (Cl. 127—23)

This application is a division of copending application Serial No. 856,730 filed December 2, 1959, now U.S. Patent No. 3,119,719.

The primary object of the present invention is the production of a new physical form of starch. Further objects are to provide a method of and means for producing the same.

The novel product of the present invention is a hard, grain-like mobile form of starch which is readily dispersible in water and which exhibits no change in physical and chemical properties over the loose or uncompacted form of starch from which it is produced, except that it is compacted into a flake or sheet which is broken and screened to a predetermined size or range of sizes. It is suitable for household or other use, and has the useful properties and capabilities of such prior forms of starch as lump, crystal, grit and pearl starch products, and it is free of dust as produced, and it is sufficiently hard, cohesive and abrasion resistant to permit of shipment, handling and pouring with substantial freedom from evolution of dust. We designate it herein a dustless starch.

The production of a dustless starch has long been an unattained objective of the starch industry. Various processes for the purpose have been devised as the patented art reveals, but while the demand for such a process and product has been persistent, so far as we have been able to ascertain, none has been forthcoming.

A basic concept of the present invention is to compact a loose or powdered starch having a moisture content of about 8% to 17% at a temperature of from about 40° F. to about 180° F., by mechanical pressure into a hard, flat, parallel sided flake of substantially the same density throughout its cross section without producing change in the nature of the starch granules for the normal uses thereof. In the present specification and claims we employ the term "granules" in reference to the small bodies of naturally occurring starch. The term "flake" or "sheet" designates the compacted body of more or less continuous character coming from the relatively smooth rolls by which the material is compacted. The term "compacted particles" or "compacted fragments" or "compacted grains" refer to pieces of said body of compacted granules. Said compacting is to be done by pressure alone, that is, without additives, such as binders, to make the granules stick together and without producing gelatinization or incipient gelatinization which would interfere with the dispersibility or other useful properties of the starch.

We are aware that it has been proposed to compact starch granules by producing incipient gelatinization or so much surface gelatinization as will produce adhesion of the granules to each other. This has been attempted by combination of heat and pressure. See Jefferies No. 2,098,293 and Horesi No. 2,168,524, which pass the starch through cocurrent rolls. Also, it has been done by pressure and various degrees and kinds of mechanical working of the starch in the course of extrusion as in Gill No. 2,214,018; rubbing between rolls operating at different speeds, as in Hansen No. 2,464,018, and briquetting between fluted rolls with offset flutes, as in Smith No. 2,907,685. Gelatinization is undesirable, since it changes the character and performance of the starch. To produce only so much as will make the granules stick together and no more is too delicate a matter to be feasible. But it has heretofore been thought to be necessary to produce a definite amount of gelatinization to make the granules stick together.

The real trouble appears to have been the trapping of air or other gas in the body of starch undergoing compaction which trapped gas when it is compressed tends to reduce the pressure of the granules against each other while the gas containing material is being operated on by the compacting forces, whereby said grains do not adhere to each other firmly, and then when the mechanical pressure is released, the compressed air expands and tends to drive the compacted mass apart. According to the preferred practice of our invention, the mass of starch granules to be compacted is deaerated prior to or in the course of compacting the same. Thereby the mechanical pressure applied at the opposite sides of the flake is sustained by the granules solidly engaging each other, and is not sustained in part by intervening air.

The process has been successfully applied to unmodified corn starch (maize), to unmodified sorghum grain starch, to modified corn starch and to pre-gelatinized spray-dried starch. It is considered to be applicable to unmodified starch of any origin.

We do not intend to limit the invention to starch or its derivatives as the material to be compacted, but contemplate the application of the invention to very finely divided materials containing air or other gases and which are capable of being compacted by pressure of the rolls.

The continuous deaeration of the finely divided material, such as starch, to permit it to be compacted by pressure operating either intermittently or continuously, is, so far as we are aware, a new procedure in the art. According to our preferred practice, we employ it in connection with smooth cylindrical rolls in operating upon loose starch without any additive serving as a binder, but it may be used with corrugated rolls or other compacting means, and it may be used where the finely divided material includes a binder. The true scope of the invention is to be ascertained from the appended claims.

A further object of the invention is to produce deaeration of loose air-containing starch or like material, and particularly to accomplish this deaeration in advance of or in the course of compacting the material into a cohesive mass. This action is preferably accomplished by squeezing or pressing the air-containing starch against a wall of porous material which prevents the escape of the starch through the pores of said wall, but permits the air to escape therethrough.

A further object of the invention is to compact a mass of deaerated starch granules into a dense cohesive flake. A further object is to produce a flake of compacted starch granules, which flake and the fragments thereof are of substantially uniform density throughout.

A further object of the invention is to control the conditions of pressure, moisture and temperature along with deaeration, so that a suitable high density of the compacted starch may be attained without gelatinization or other change affecting the dispersibility or other useful properties of the starch.

The deaerated starch is compacted by mechanical pressure alone, into a hard compact flake of substantially uniform density throughout, preferably by smooth pressure rolls which produce it as a sheet or flake of substantially uniform thickness. A minimum pressure of about 1500 pounds per linear inch of roll face on 20" diameter rolls is required to make the starch of 8%–17% moisture and 40° F.–180° F. temperature stick together satisfactorily. The maximum pressure for those conditions of temperature and moisture is on the same size of rolls about 15,000 pounds per linear inch of roll face. The flake or sheet produced by said roll pressure is thereafter mechanically broken up into fragments. Breaking as distinguished from crushing is employed to minimize dust formation. By screening, a desired size or range of screen sizes of particles is selected and constitutes the product. Compacting the starch granules by mechanical pressure to a high density flake and then breaking the compacted flake into grain-like fragments appears to increase the ease and the rate of dispersion of the starch in water. The fragments are screened to a range of sizes such, for example, as between about 3 mesh to about 20 mesh. The range of screen sizes may be selected to meet the customers' requirements. The compacted flake itself is similarly capable of rapid dispersion, and may be supplied, but it lacks the mobility of the fragments.

The grains or fragments of compacted starch are in the mass free flowing and being chips of hard material may be shipped, handled and poured without appreciably producing or releasing dust.

With a dry unbonded solid material, such as starch, having granules of a size of the order of 15 microns, it is not possible to avoid the production or evolution of some dust in the case of extensive shaking, handling or agitation of the product. However, in the normal handling, shipment and pouring of the product of the present invention, the evolution of dust is substantially non-existent. Freedom from the evolution of dust is desirable for good plant housekeeping, since the accumulation of starch dust is unsightly and insanitary. Moreover, dust in the air can be dangerous. In specific industries, such, for instance, as the brewing industry, starch dust particles may serve as a vehicle for growth of undesirable bacteria or moulds. In connection with general or household use, freedom from dust is consistent with cleanliness and nicety.

While the bare fact that certain powdered material may be compacted by pressure into a relatively hard dense product, as in tabletting pharmaceutical materials, is known, no useful result has flowed from that knowledge, so far as concerns the production of a dustless starch. Not only must the starch be rendered dustless, but it must retain all the favorable qualities of the original material, and gain improved mobility and dispersibility. If the density of the compacted flake exceeds a rather critical value somewhere around 95 pounds per cubic foot, the dispersibility of the product is adversely affected, i.e., it is slowed down or interfered with. The limits of density for a satisfactory product are 65 to 95 pounds per cubic foot lump density. Values within this range are selected to meet customers' requirements.

We have found by experiment that the factors of pressure, temperature and moisture content are to some degree interrelated, and must be controlled to avoid changing the character of the material operated upon, i.e., starch. It is known empirically that increased temperature of the starch entering the rolls increases the degree of cohesion, as shown by the production of a harder and denser flake. It is also known empirically that increases in pressure, temperature, and moisture conditions increase the tendency toward starch gelatinization.

The marketing of this type of product requires a high rate of production, but prior to the present invention, no means suitable for production of compacted starch in volume was available. We undertook to pass the loose starch between concurrent compacting rolls operating at the same speed, since this afforded the possibility of a high rate of production. We immediately encountered difficulty in the operation of compacting rolls from several directions. First, the loose powder refused to enter the bite of the rolls for any substantial thickness of flake or sheet. Too thin a flake or sheet is undesirable because the thin layer of starch is too sensitive to any inequalities of the feed material and volume of production tends to be too low. With entrapped air, it is hard to get the loose powder into the bite of the rolls, for the tendency is to avoid entry into the zone of pressure. Also too great a tendency to form fines is involved where the flake is too thin.

We finally solved this difficulty by providing means for positively forcing the powder to enter the bite of the concurrent rolls. Our initial experiments employing forced feeding were made on relatively short smooth rolls 6 inches long and 20 inches in diameter. We found that with forced feeding of those short rolls, we could produce fairly good results with a sheet or flake of substantial thickness, since due to the thickness of the flake and short distance edgewise toward the ends of the rolls there was less tendency to entrap the entrained air. But with a roll length of 20 inches, the results of forced feeding alone were not satisfactory. We found that forced feeding was necessary to fill the gap at the high roll pressures desired, and forced feeding in conjunction with deaerating means was needed to get enough of the entrained air out of the powder to produce a solid coherent flake of substantially the same density at the center as at the exposed surfaces.

The thickness of the flake or sheet may be greater or less than that of the particles or fragments to be produced. It is generally desirable as taught in the specific embodiment herein disclosed to make the thickness of the flake small enough that the desired particles or fragments of the finished product can be produced by breaking the flake as distinguished from crushing the flake or parts of the same. Crushing or excessive impacting tends to produce an unnecessarily large proportion of fines. Fines are objectionable. However, reduction of the thickness of the flake or sheet to a value below about 0.02 inch or less appears to render the starch in the flake much more sensitive to any unevenness in the starch feed texture with subsequent gelatinization or incipient gelatinization in parts of the same.

A second problem which required solution before commerical operation could be undertaken was the difficulty of carrying out compaction of starch at a high rate by rollers of greater length because of inability to get rid of entrained air. The high degree of pressure and the high rate of compression where substantial volumes per unit of time were to be thus compacted, rendered the problem acute. The flake or sheet formed under those conditions tended to split because of the lack of cohesion due to the presence of entrapped air.

The preferred form of feed starch employed in the production of the compacted mass is a loose powder. Flash-dried starch under controlled conditions is the preferred feed material primarily because it involves minimum cost of preparation. Lump or hard particles can cause local regions of modification which tend to interfere with uniform prompt dispersion, and tend to render the product less desirable or even non-commercial.

The loose free flowing powder which constitutes the feed material tends to contain and/or entrain a considerable proportion of air, and unless an orderly extraction or evacuation of the air can be brought about, reliable and uniform compaction of a sheet or flake cannot be assured.

We found that in the absence of adequate deaeration of the feed material, the air tended to accumulate along the median zone between two denser surface portions and to prevent the forcing of the granules into adhering engagement along this central region. As a result, the output of the rolls was a flake or sheet which was dense at the outside and softer at the inside surface and which tended to separate into two parallel flakes. This tendency of the flake to split was less pronounced in the case of short rolls, for example 20 inch diameter rolls 6 inches long where much of the air could escape endwise without too much difficulty. But when the rolls were increased in length to 20 inches to increase output, the deaeration problem was acute and required solution before a dense flake of the necessary thickness could be produced.

The problem of getting air out of pulverulent materials as they are being compressed is recognized in the art of tabletting small bodies, such as pills, tablets and lozenges for medicinal purposes, and attempts to meet or avoid it are shown in the prior art. However, such expedients as were available to the tabletting art, where relatively minute quantities are acted upon by punch and die to form separate bodies, provided no solution for the problem of rapid and continuous disentrainment of air from the starch being subjected to roll compaction.

We conceived, as the result of our experiments, that in the operation of roll compression of starch, the removal of the air had to be a continuous operation, and it would best be done in the region where the entrained air was subjected to a fairly high degree of compression for there it would have maximum potential for escape, due to its inherent energy.

We conceived the possibility of providing a porous wall in contact with the feed material in the region of flow of the material under pressure towards the bite of the rolls. The gases which it is desired to evacuate pass through the pores of the wall, but starch grains are retained. The clogging of the pores is minimized or prevented by the continuous scouring of the surface of the porous wall by the moving stream of material under high pressure.

It is an object of the present invention to provide a process and means for compacting starch and like materials with continuous evacuation of entrained air from the feed material.

It is a further object of the invention to provide a process and means for precompressing the starch and entrained air and to vent the air from said precompressed starch and then compacting the starch into a dense, hard, dustless flake.

It is a further object of the invention to provide a novel form of gas liberating means for deaeration of pulverulent materials.

The manner in which we attain the objects above enumerated and others will be apparent later will now be explained in connection with a description of the preferred embodiment of the invention.

In order to acquaint those skilled in the art with the manner of constructing and practicing our invention, we shall describe, in connection with the accompanying drawings, a specific embodiment of the same.

Figure 1:
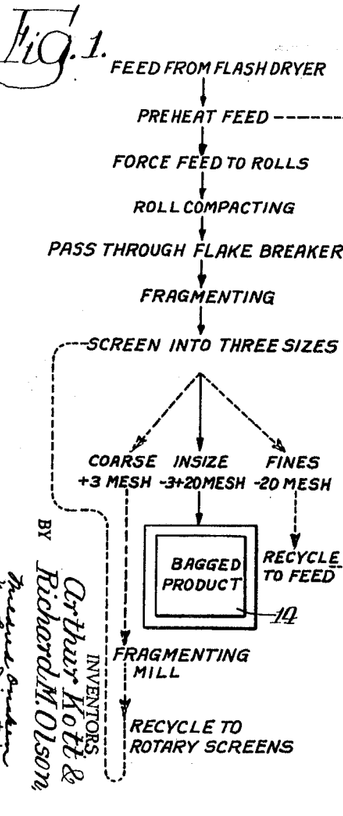
FIGURE 1 is a flow diagram of the various steps of the process.

The steps of the process, and the order and the manner in which they occurs, are indicated in FIGURE 1.

Figure 2:
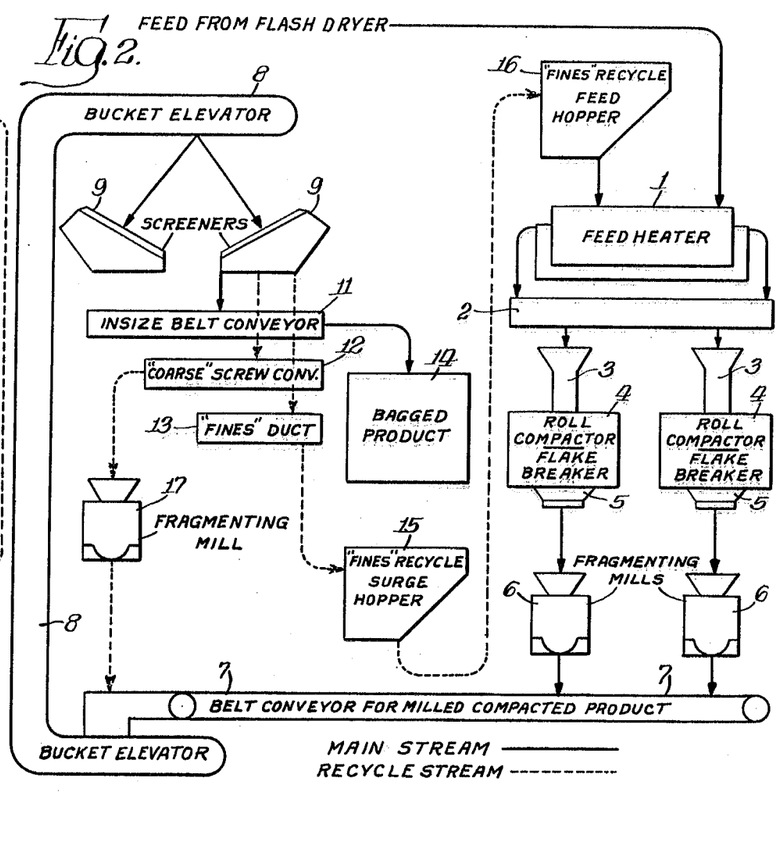
FIGURE 2 is a schematic layout of the equipment for performing the operations indicated in FIGURE 1.

A layout of means which is suitable to carry out the aforesaid process steps is indicated in FIGURE 2.

Figures 14, 15:
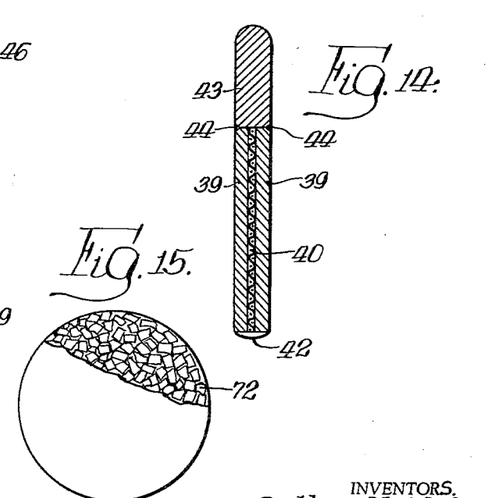
FIGURE 14 is a cross sectional view taken on the line 14—14 of FIGURE 11.
FIGURE 15 is a plan view of a mass of loose fragments of compressed starch according to the present invention.

The product is illustrated in FIGURE 15.

As indicated in FIGURE 1, starch is fed from the flash dryer where the final removal of water from a starch slurry is performed. This starch is essentially a powder consisting of granules of starch substantially of the form in which they occur in nature, although they have been separated from other materials, notably gluten and fiber. These small bodies or particles of starch in terms of art are generally referred to as "granules." See "Chemistry and Industry of Starch," second edition, by Ralph W. Kerr, edition of 1950, by Academic Press, Inc., publishers. Starch granules are reported to vary in size from about 2 microns to about 150 microns. Corn starch, with which this invention is largely concerned, consists of granules of a mean size of approximately 15 microns.

The starch from the flash dryer is conveyed to the feed heater 1, where the starch is pre-heated. One effect of preheating is to reduce the viscosity of the entrapped air in the feed starch. In the step of preheating the temperature is raised to between 90° F. and 180° F. The moisture at this stage is normally maintained at 8% to 14%. The feed heater 1, which is supplied with feed from the flash dryer, as indicated in FIGURE 2, consists of a conveyor, which may, for example, be a screw conveyor, with a heating jacket for hot water. It delivers the warmed starch to a distributor 2, which in turn supplies the pre-heated starch to the force feeders 3, 3. These force feeders 3, 3 are preferably vertical screw conveyors for forcing the starch into the roll compacters 4, 4. These roll compacters essentially comprise housings in which there are contained the compacting rolls 18, 18 (see FIGURE 3) into the bite of which the force feeders 3, 3 compel the starch to flow. The starch is compacted into a flake or sheet issuing from between the compacting rolls into flake breakers 5, 5, which break up the flake or sheet into coarse pieces and deliver the same to the fragmenting mills 6, 6. These fragmenting mills 6, 6 break up the larger pieces of flake coming from the flake breakers 5, 5 and reduce the size of the pieces to where the major amount of the starch fragments will be of a size between 3 and 20 mesh per inch. The flake breaker 5 and the fragmenting mill 6 may consist of pairs of rolls with inter-digitating teeth of a proper size to reduce the flake to fragments of the range of sizes above indicated. Alternatively, a hammer mill employing a knife type of hammer may be used for this flake breaking operation. Such devices are of the prior art. Such dust as is produced by the flake breakers 5, 5 and by the fragmenting mills 6, 6 may be removed by controlled air currents in a "dedusting" operation. From the fragmenting mills 6, 6, the compacted starch in fragments is delivered to a belt conveyor 7. These fragments in appearance resemble small chips of white marble. The milled compacted product is delivered by the belt conveyor 7 to a bucket elevator 8 which at its upper end delivers the milled compacted product to oscillatory screens 9, 9. The screens 9, 9 discharge the milled product in three sizes to corresponding conveyors 11, 12 and 13. The conveyor 11 receives so-called "insize" fragments, which are then delivered to a packaging station 14, where the product is bagged for commercial purposes. The "insize" fragments conveyed to the packaging station 14 are those which are passed by a 3 mesh screen and retained on a 20 mesh screen, as indicated in FIGURE 1. The fines which pass through a 20 mesh screen are delivered to a surge hopper 15 for recycling the fines to a feed hopper 16, which in turn delivers the fines along with the starch from the flash dryer to feed heater 1. The over-size fragments are received by the screw conveyor 12 and are delivered thereby to the fragmenting mill 17 which is constructed like the fragmenting mills 6, 6, and which reduces the over-size fragments to smaller sizes and delivers them to the belt conveyor 7, and they are in turn, along with the product of the fragmenting mills 6, 6 delivered to the bucket elevator and rescreened at the oscillatory screens 9, 9.

Figures 3, 4, 5:
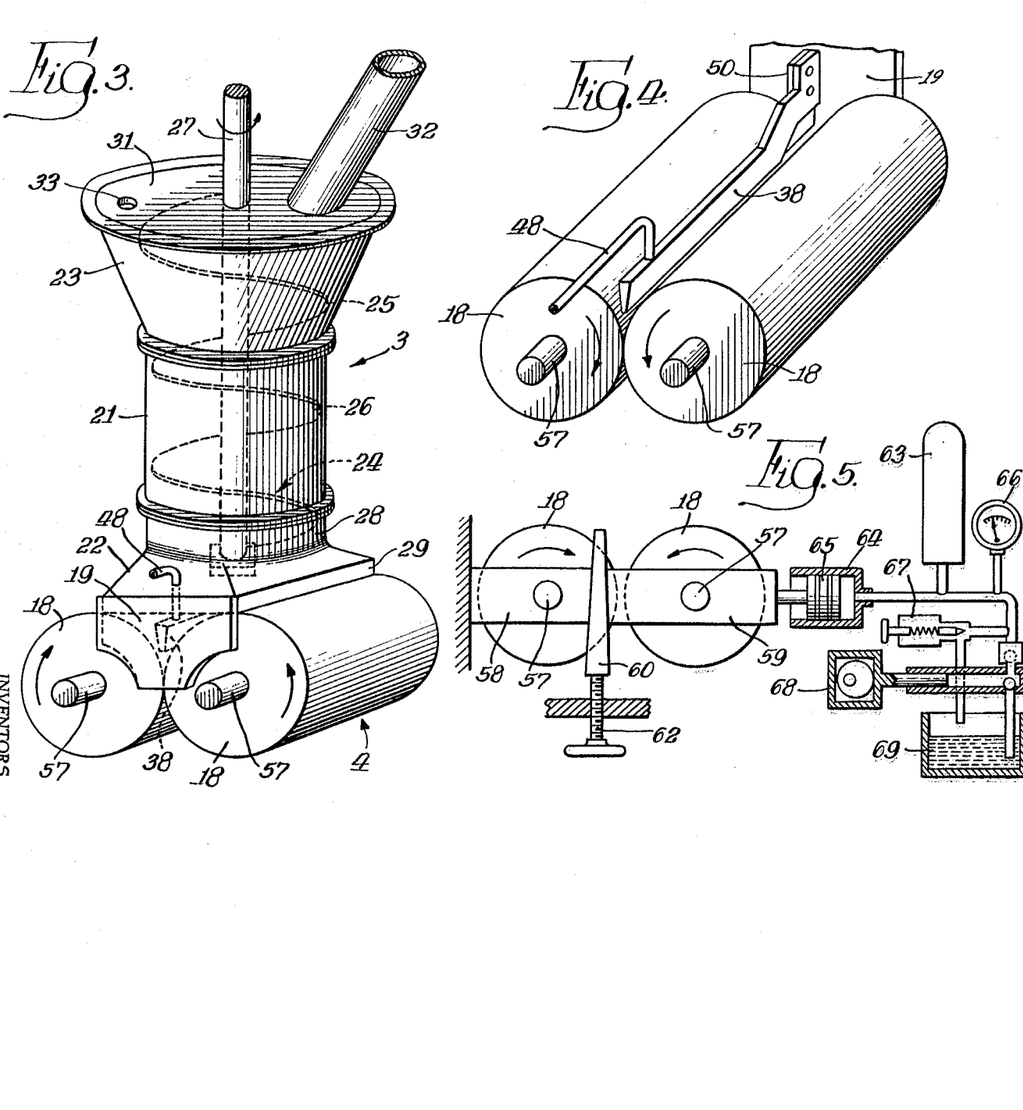
FIGURE 3 is a diagrammatic showing of the force feeder and the compacting rolls cooperating with the same.
FIGURE 4 is a diagram of the rolls with the deaerating vane or bar disposed adjacent the bite of the rolls.
FIGURE 5 is a diagrammatic showing of the means for spacing the rolls and holding them under predetermined hydraulic pressure.

Referring now to FIGURE 3, which shows diagrammatically the roll compactor 4 and its force feeder 3, two cylindrical rolls 18, 18 with smooth or etched surfaces are driven by common drive means (not shown) to rotate at the same speed toward each other, that is, in opposite directions around their longitudinal axes, to effect a bite or nip between them. A suitable housing (not shown) encloses these rolls, essential parts of which housing are the end plates 19, 19, see FIGURES 3 and 4, which form cheek pieces or end plates enclosing the ends of the trough formed between the rolls 18, 18. Additional walls for completely enclosing the rolls and connected parts and a machine frame of any conventional or suitable form for supporting the operating rolls and other parts will be provided, as will be understood by those skilled in the art. Cooperating with these end plates or cheek pieces 19, 19 is a lower part of the force feed housing of the force feeder 3 known as the transition section 22. The force feeder 3 is a screw conveyor consisting of one or more cylindrical sections 21, conical feed section 23 at the top, and a transition section 22 at the lower end. Within these housing sections there is disposed a suitable feed screw 24, consisting of a conical flight 25 and a cylindrical flight 26. Both are mounted upon a vertical drive shaft 27, which extends down to the lower end of the feeder 3. The transition section 22 is formed with a cylindrical upper end 28, and a rectangular lower end 29 with the walls in between merging from the rectangular to the cylindrical, whereby the material forced downwardly by the feed screw 24 is delivered substantially uniformly throughout the valley between the rolls 18, 18. The conical or hopper section 23 at the upper end has a cover 31 through which the shaft 27 extends. Also, there is provided a supply tube 32 through which the starch supply enters the feeder. An air vent 33 in the cover 31 is provided for venting air or such other entrained gas as become freed from the entering material.

Figures 6, 7, 8, 9, 10, 16, 17:
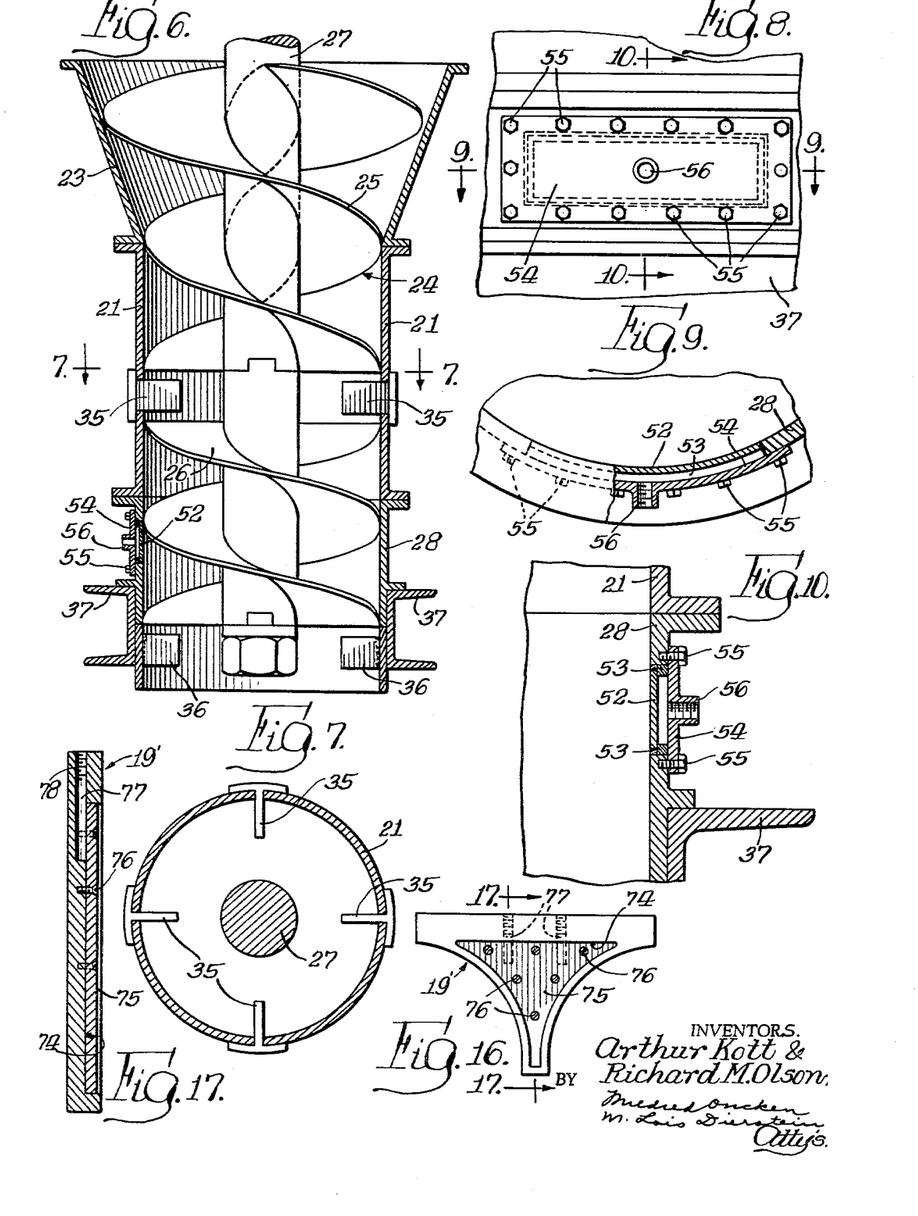
FIGURE 6 is a vertical section through one form of force feeder for feeding the pulverulent material to the rolls.
FIGURE 7 is a horizontal cross section on the line 7—7 of FIGURE 6.
FIGURE 8 is a side elevational view of a deaerating panel on the force feeder.
FIGURE 9 is a horizontal cross sectional view on the line 9—9 of FIGURE 8.
FIGURE 10 is a vertical longitudinal section taken on the line 10—10 of FIGURE 8.
FIGURE 16 is a face view in elevation of a modified form of cheek plate embodying a deaerating panel.
FIGURE 17 is a vertical section on an enlarged scale taken on the line 17—17 of FIGURE 16.

In FIGURES 6 and 7, we have indicated the force feeder 3 as provided with flow controlling vanes 35, 35 in the housing section 21 between adjacent sections of the conveyor screw 24. These vanes which are optional, are flat plates with rounded advance edges and they lie in planes extending through the longitudinal axis of the feeder. Similar vanes 36, 36 are shown as disposed below the lower end of the feed screw 24 in advance of the movement of the material into the transition section 22. The purpose of these vanes is to offer resistance to rotary motion of the material being fed, and to cooperate with the feed screw in forcing the material to move downwardly into the valley between the rolls and eventually into the bite of the rolls. These vanes 35, 35 and 36, 36 are not essential and may be omitted.

The loose powdery material, in this case the starch, tends to entrain air or other gases in contact with it to such an extend that when the material is subjected to the necessary pressure to produce compaction, the entrapped air, if not vented or removed in some other manner, will tend to keep the particles from full pressure contact with each other and upon release of the mechanical compacting pressure, to disrupt the flake or compacted mass by its expansion. Since the pressure which is put upon the starch in the bite of the rolls would normally run between 3,000 and 10,000 pounds per linear inch of roll, it can be seen that gas compressed to this pressure will, if the restraint is rapidly released, disrupt the flake or particle which is formed by such compaction.

The means for venting the entrapped air from the starch in the course of its compression and final compaction includes not only the open air vent 33 above referred to, but more particularly includes means for venting the air from a moving mass of the powder-like material. A deaerating vane or bar 38 which may be variously constructed, but one form of which is shown in the attached drawings, see particularly FIGURES 3, 4 and 11 to 14 for one form of such a device. The bar or vane for best effect is disposed in the valley between the rolls 18, 18 immediately above the bite of the rolls where the pressure of the feed material entering the rolls approaches the pressure occurring in the bit of the rolls. The ends of the deaerating vane 38 are carried on the adjacent end plates 19, 19.

The deaerating vane 38, illustrated diagrammatically in FIGURES 3 and 4 and in detail in FIGURES 11 to 14, comprises two plates of porous metal 39, 39 with a metallic woven wire screen 40 between them to operate as previous spacer for the plates. The porous metal has pores of a mean size between about 20 to 50 microns. The lower edges, the side edges, and a part of the top edges of these two plates 39, 39 are sealed over at 42 by stainless steel welds or with silver solder or the like. A solid steel reinforcing plate 43 is disposed edgewise to the upper edges of the two porous plates 39, 39, and is welded along its lower edges to the upper edges of said porous plates to support them against the downward pressure of the flowing material driven by the feeder 3 into the bite of the compacting rolls 18, 18. The plate 43 is secured and sealed as by silver solder at its lower edges 44, 44 to the upper edges of the porous plates 39, 39. At the outer ends of the solid bar or plate 43, tubular connections 45, 45 in the form of short nipples are welded to the plates 39, 39 and to the ends of the bar or plate 43. These nipples 45 communicate with the space between the plates 39, 39. Pipe couplings 46, 46 are connected by means of threads to the upper ends of the nipples 45. The nipples 45 and couplings 46 are welded at their adjacent sides to the respective ends of the plate or bar 43, and upon their outer sides to lugs 47, 47, which are also welded to the upper edges of the plates 39, 39. Air venting pipes 48, 48 are threaded into the couplings 46, 46 and lead to the outside of the casing for permitting air from the space between the porous plates 39, 39 to be vented to atmosphere or be drawn out under vacuum through said nipples 45, 45, couplings 46, 46 and vent pipes 48, 48.

Figure 11:
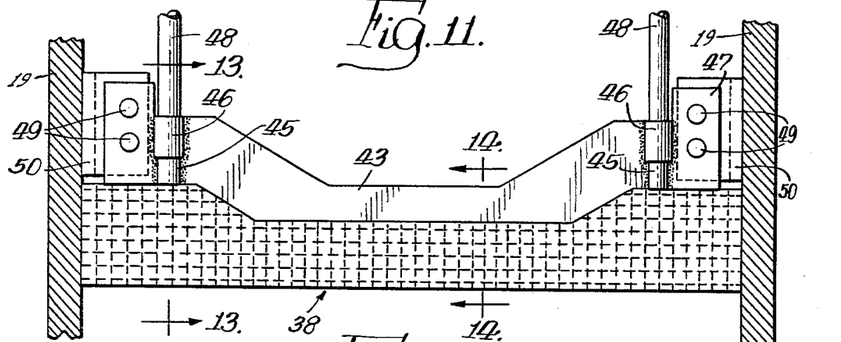
FIGURE 11 is a side elevational view of the deaerating vane.
Figure 12:
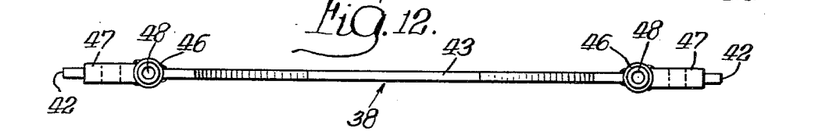
FIGURE 12 is a top plan view of the same.
Figure 13:
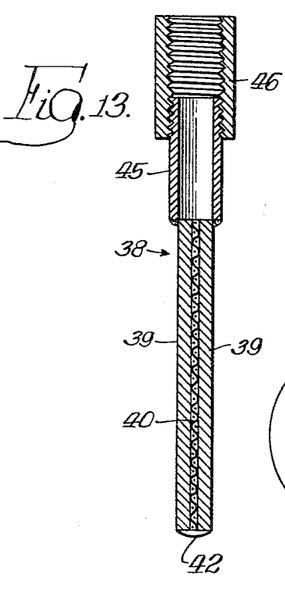
FIGURE 13 is a cross sectional view taken on the line 13—13 of FIGURE 11.

The deaerating bar or vane 38 is preferably supported at its ends by connection to the adjacent end plates 19, 19 as shown in detail in FIGURE 11, and thence to the machine frame. The lugs 47 which are welded to both the porous plates 39, 39 and to the reinforcing bar 43 through the intermediary of the nipples 45 and couplings 46 are provided with bolt holes 49, 49 which register with similar holes in brackets or flanges 50, 50 mounted on the mentioned end plates 19, 19 above the rolls 18, 18.

For the same purpose of causing or permitting the venting of entrained air porous walls in contact with the flowing material under some degree of pressure may be provided, for example, in the cylindrical casing of the feeder 3. For this purpose, an opening is formed in the cylindrical wall of the section 28, see FIGURES 6, 8, 9 and 10. Preferably, this is an oblong rectangular opening. Into it is fitted a porous plate 52 which is suitably curved and which lies flush with the inner surface of the wall of the section 28 served by the feed screw portion 26. This porous metal wall 52 is connected mechanically through an intervening spacer 53 to the cover plate 54, which cover plate and spacer are made of impervious metal. The edges of the cover plate 54 extend over the margins of the cylindrical wall 28 about the opening and said overhang or flange portion is clamped to the outer surface of the wall 28 by cap screws 55. A threaded nipple 56 for connection with a vent pipe to atmosphere is provided at the central portion of the said plate 54. The inner portion wall member 52, the spacer 53 and the plate 54 are suitably welded together to form a structural unit. Such gas venting units as the one shown in FIGURES 6, 8, 9 and 10 may be disposed at locations around the circumference of the wall 28, or may be disposed at any other suitable part of the conveyor housing or the transition section 29 where the material, such as starch, with entrained gas, such as air, is put under pressure.

As shown in FIGURES 6 and 10, the housing of the feeder 3 is supported from the frame in which the rollers 18, 18 are mounted by means of a pair of spaced channel bars 37, 37 extending parallel to the axes of the rollers 18, 18. These channel bars 37, 37 are attached at their central portion to the housing of the feeder 3, and are attached at their ends to the frame (not shown) which support the shafts 57 of the rollers 18, 18 and the cheek plates 19, 19. The function of the air venting plugs or inserts shown in FIGURES 6, 8, 9 and 10 is to allow the escape of air from the material as it is being put under pressure by the feeder worm or screw as it is forced into the bite of the rolls.

In order to obtain a predetermined pressure upon the material passed between the rolls, it is necessary that the rolls be loaded, that is, forced towards each other under a predetermined loading, whereby the material will be compacted. Likewise, they must be spaced from each other at that loading in order to secure a flake or sheet of predetermined thickness. Thus assume the flake or sheet of thickness of 0.20 inch is desired, and a pressure of from 3,000 to 10,000 pounds per inch of length of the rolls be exerted upon the material produced, suitable means for corresponding loading and spacing of the rolls are required. In FIGURE 5 we have indicated diagrammatically how the rolls may be loaded and spaced. The shafts 57, 57 of the rolls 18, 18 are mounted in blocks or journal boxes 58, 59, with a spacer 60 between the adjacent journal boxes 58, 59, so as to space the rolls apart by predetermined distance. This spacer 60 may be in the form of one or more shims or it may be a wedge or the like to provide an adjustability of the gap between the rolls. As shown in FIGURE 5, the wedge is adjustable by means of a screw 62 for controlling the spacing of the rolls. Pressure from a hydraulic accumulator 63, partly filled with air, is exerted upon the journal box 59 by means of the cylinder 64 and piston 65 which latter presses against the said journal box 59, in accordance with the pressure prevailing in the accumulator 63. This pressure may be determined by inspection of the gauge 66 which is graduated in terms of roll pressure per unit of length, or any convenient factor of compacting force, and it may be adjusted by means of an adjustable pressure release valve 67. A continuously running pump 68 delivers a small amount of liquid under pressure to the accumulator 63 subject to the opening of the pressure release valve 67 which returns the liquid to the reservoir 69. A similar cylinder with pressure supplying and indicating means is applied to the opposite end of the shaft 57 of the roll mounted in the movable journal blocks 59, so that the two ends of the single adjustable roll will be similarly controlled and equally loaded at the same time.

The flake breaker 5 is of known form and construction, and may consist, for example of a pair of studded rolls which are driven in unison, rotating towards each other, and breaking up the flake or sheet into relatively coarse fragments. Alternatively, the teeth or studs on the rotating roll may pass through stationary teeth mounted on the inside of the housing for the roll. The fragmenting mills 6 may be of any type suitable for subjecting the broken flake or sheet to a fragmenting action which is designed to result in a large proportion of the fragments being able to pass, for example, a three mesh per inch screen and to be held, for example, on a 20 mesh per inch screen to constitute the desired product. In FIGURE 15, we have shown the general appearance of the fragments 72 of the commercial products, namely, compacted fragments of a size of minus 3 plus 20 mesh. This range of sizes of the fragments gives substantially minimum dispersing time. For longer dispersing times, larger size or smaller size fragments may be produced. Alternatively, the fragments may be composed of a more highly compacted material.

The pressure gauge 66 may be common to the two ends of the adjustable rolls, or a gauge individual to each end of the adjustable roll may be provided, particularly where each end has its individual control valve. These gauges may be graduated in terms of pounds per inch of the length, the matching faces of the rolls, or other suitable indication of the unit pressure applied to the starch. The two rolls 18, 18 are geared together and driven in unison by variable speed driving mechanism not shown.

From a practical standpoint, it is difficult and inconvenient to make a determination of the pressure in pounds per square inch of the bite of the rolls upon the starch. It is convenient to measure the pressure applied to the rolls in terms of pounds per lineal inch of the working faces of the rolls. Where the rolls are filled with starch the pressure on the rolls is also the pressure upon the starch. Consequently, the latter method of designating pressure is employed in practice.

The deaerating vane 38 is disposed close to the bite of the rolls, considering at the same time that the starch must be permitted to flow freely into the bite of the rolls. We have explored the pressures prevailing in the material being operated upon, and find that the air pressure in the material approaching the bite of 20 inch diameter rolls stands at about 20 inches of water at about 7 inches from the bite of the roll, and rises to about 37 inches of water at 5 inches from the bite of the rolls, and then rises rapidly to about 80 inches of water at 2½ inches from the bite of the rolls, and about 150 inches of water at 2 inches from the bite of the rolls.

In FIGURES 16 and 17 I have illustrated a modified cheek plate 19' which serves not only to close off the ends of the valley between the rolls 18, 18 as do the cheek plates 19 in FIGURES 3 and 4, but serves also as a means to evacuate air from the compressed starch in contact with the inside surface of said plate. The body of the cheek plate 19' has a shallow recess 74 formed in or routed out of the inner face of the same. This shallow recess is formed to a uniform depth to receive a deaerating panel 75 in the form of an inlay of ⅜ inch thick porous sheet 75 of sintered bronze having a mean pore size of from 20 to 50 microns. This inlay is held in place by a series of flat headed counter sunk machine screws 76, 76. The edges of the inlay may be brazed or welded to the edges of the recess, but I find that such sealing of the edges is not essential. The end faces of the rolls 18, 18 preferably overhang the edges of the inlay Passages 77, 77 for the escape to atmosphere of air forced through the porous inlay 74 are drilled vertically into the body of the cheek plate 19' and communicate with the inside surface of the inlay plate 75. At their outer ends, the passageways terminate in sockets 78 threaded to receive ⅛ inch pipe. Pipes threaded into said sockets lead to atmosphere as does the pipe 48 shown in FIG- URE 3 to vent whatever gas is forced through the porous plate. The gap between the back of the inlay 75 and the bottom of the recess 74 is sufficient to allow air to escape to and through the passageways 77. Shallow grooves radiating from the passageways may be employed. Whatever deaerating means be employed, it should not interfere materially with the free flow of the feed material to the bite of the rolls.

In a typical run of the process and employing the above described equipment in performing the same, compacted starch flakes were produced at the rate of 200 pounds per minute per machine, using rolls which were 20 inches in width and 20 inches in diameter and had smooth cylindrical surfaces. The force feeder comprises a casing having a conical upper end and a cylindrical lower end communicating with a transition section. A screw or worm of approximately 19 inches in diameter for the cylindrical portion of the feeder was operated at 25 to 50 revolutions per minute. The worm in each section fits with a mechanical clearance. Longitudinal ribs or grooves may optionally be employed on the inner wall of the feeder casing to cooperate wtih the worm in driving the material forward, i.e., down. The deaerating vane 38 was disposed approximately 7½ inches above the bite of the rolls during operation. Gas pressures as high as 6 p.s.i.g. were found to occur in the valley of the rolls and solids pressures as high as 35 p.s.i.g. were found within the transition section of the force feeder. The solids pressures were highly directional because of the flow of the material.

The force feeder must supply the starch to be compacted at a rate such that loose starch cannot pass uncompacted through the roll spacing, but instead, it will be bitten by the rolls and must be compacted in order to pass therethrough. Total production rates of material passed through the rolls ranged from 75 to 240 pounds per minute with the rate of flake production ranging from 40 to 174 pounds per minute. The rolls were operated at speeds ranging from about 12 r.p.m. to 25 r.p.m. for the aforesaid production. Flake yields ranged from 40 to 87% of the through-put.

In a second typical operation of the process and the equipment for performing the same, the force feeder 3 consisting of a conical section 23, a cylindrical section 21 and a transition section 22, employed a double worm having the diameter of the cylindrical portion of the feeder approximately 20 inches. It was operated at a speed of 26 r.p.m. The feed temperature of the starch deliverd to the conical portion was approximately 144° F.

The compacting rolls of 20 inch diameter, 20 inches long, were operated at a speed of 28 r.p.m., with bearing pressure providing pressure of 10,000 pounds per inch of length of the rolls.

The flake breaker 5, consisting of a series of moving fingers interdigitating with a like series of stationary fingers, was operated at 200 r.p.m. The fragmenting mills 6, 6 which received the broken flake directly from the flake breakers 5, 5 were operated at a speed of 1000 r.p.m. with screen openings of ⅞ inch. The rate of flow through the compacting rolls to the flake breaker 5, 5 for both compacters was 400 pounds per minute. The flake content of the through-put was 85 to 90% and the flake thickness was 0.15 inch. The oscillatory screeners 9, 9 employed top deck screen openings of 3 inch mesh, and bottom deck screen openings of 20 inch mesh.

Coarse flake discharged from the rotary screener's top deck to the coarse screw conveyor 12 was at the rate of 150 pounds per minute. Production of the "insize" product from the rotary screeners 9, 9 was at the rate of 300 pounds per minute. The recirculation of fines to the fines recycle feed hopper 16 and coarse fragments to the fragmenting mill 17 accounts for the overlap of these figures.

An analysis of the bagged product produced from modified corn starch showed the following:

(1) Moisture, percent ______________________________ 10.0
(2) Wet grit, percent (D.B.) _________________________ 0.23
(3) Dustiness ______________________________________ 0.63
(4) Dispersibility ___________________________ 1 min. 15 sec.
(5) Bulk density, lb./cu. ft. ___________________________ 49
(6) Solubles, percent (D.B.) _________________________ 0.60
(7) Lump density, lb./cu. ft. __________________________ 87

Analysis of the bagged product produced from raw corn starch showed the following:

(1) Moisture, percent ______________________________ 9.7
(2) Wet grit, percent (D.B.) _________________________ 0.68
(3) Dustiness ______________________________________ 0.75
(4) Dispersibility ___________________________ 1 min. 30 sec.
(5) Bulk density, lb./cu. ft. ___________________________ 50
(6) Solubles, percent (D.B.) _________________________ 0.35
(7) Lump density, lb./cu. ft. __________________________ 86

The "dustiness index" is a comparative figure determined by subjecting a predetermined quantity of the material under consideration to a predetermined agitation as by rolling in a drum at a predetermined speed for a given period of time with a predetermined current of air flowing over the material under agitation. The dust is recovered and weighed, or alternatively the loss of weight of the charge may be taken as the "dustiness index." Dispersibility is a measure of the time following the introduction of a starch sample into water with agitation within which all lumps disappear under standard empirical conditions.

The usual bulk density of lump starch of the prior art is of the order of 30 to 40 pounds per cubic foot, and the lump density of the same is about 70 pounds per cubic foot. The limits of density for a satisfactory product made according to the present invention are about 65 to 95 pounds per cubic foot lump density. The moisture will ordinarily be controlled to about 11 to 12%, but sometimes the customer may want a moisture content as low as 8, or as high as 13 to 15. This may readily be provided.

The surface of the rolls is normally etched to give it a slight degree of roughness to increase friction, and if it is found that the flake tends to adhere to the surface of the roll, a scraper blade or blades may be employed.

Deaeration for commercial operations is found to be necessary to maintain a satisfactory rate of production. We have found that with the deaerating vane 38 constructed and employed as above disclosed, the flake content of the output of the rolls runs as high as 90% with the 20 inch rolls of a 20 inch length. The porous metal of which the plates 39, 39 and the plate 52 are constructed consists of a mass of powdered metal, the particles of which are sintered together to leave pores or openings of from 20 to 50 microns in cross sectional dimension or diameter.

The porous metal may be bronze or stainless steel, or may be other corrosion resisting metal or alloy. The mean pore size is about 20 to 50 microns. The mean diameter of starch granules employed in this process is of the order of 10 microns. In the 20 by 20 inch set of rolls, a total pressure of from 75,000 to 100,000 pounds on each bearing of the above described machine was available. Such high pressures are not required for any usual flake formation.

The advantages of the product of the present invention reside chiefly in the dustless character and mobility of the product, the high bulk density and the short dispersion time for dispersion of the starch in water. The use of the present process does not change the viscosity of the dispersed starch slurry.

A further advantage of the present product is the low wet grit content thereof as compared with other commercial forms of starch. On tests which we ran on this product, the wet grit content at 25° C. increased from 0.02% in the feed starch to 0.07% and 0.05% in the roll compacted product. The significant fact is that compacting the starch by this method does not contribute materially to the formation of additional grits. The bulk density of the product will vary with the particle size and the size distribution in the product as marketed. Samples of the fragmented product which we have tested vary between 48 and 52 pounds per cubic foot. Then density of the lumps of compacted starch, that is of the flake, has ranged from 75 to 90 pounds per cubic foot.

The "lump density" of several other starch products in pounds per cubic foot for comparison is as follows:

| | |
|---|---|
| Lump laundry starch | 70 |
| Pearl starch | 60 |
| Crystal laundry starch | 66 |
| Cube starch containing binder | 75 |
| Tabletted corn starch | 75–85 |

The bulk density of these other products varies so widely with particle size and range resulting from subsequent grinding and screening operations that the values would be of no significance. The starch entering the force feeder will ordinarily enter at a moisture content of from 8 to 17%, and a temperature of from about 40° F. to 180° F. The starch issuing from the rolls has been found to have a decrease in moisture content of from .2 to 1½%.

We have compared the time for compacted starch of given dimensions and bulk density to disperse in water and compared the same with known compacted starches. Comparative tests using an empirical dispersing test technique on several starch products have been made. The following shows the comparative times in minutes for dispersion:

| | |
|---|---|
| Roll compacted starch | 0.5 to 1.4 |
| Lump laundry starch more than | 5 |
| Pearl starch | 2 |
| Crystal laundry starch more than | 5 |

No attempt was made when these tests were run to control the particle size range distribution.

Tests have been run to determine whether or not the starch granules have been damaged during compacting, including gelatinization, and we have compared the result with that of other known products.

Samples of roll compacted starch according to our invention were compared with the starting flash dried starch by all known analytical methods, namely, Scott viscosity, wet grit, intrinsic viscosity, Brabender viscosity curves, enzyme Scott, solubles and microscopic examination. No significant differences were detected, except for a tendency towards reduction in enzyme Scott. We do not regard this latter observation as of any significance as evidence of damage.

It appears that dissipation of heat occurs at a satisfactory rate, so that no special provisions for heat removal are required, and no gelatinization has been detected.

The present invention is applicable to all types of amylaceous and farinaceous materials in dry powdered form. Examples of amylaceous materials are all types of starches in unmodified form, e.g., corn (maize), wheat, rice, tapioca, grain sorghum, potato, and the like. The starch granules in such materials should be in their original form in order that the material will readily re-disperse in water after compacting. The starches may be chemically modified, e.g., oxidized or acid modified. Also the starch may be derivatized. By derivatives of starch we mean starch compounds where substituent groups, either organic or inorganic, have been introduced into the starch molecules. Examples include starch sulphates, starch phosphates, hydroxyethyl ether of starch, carboxymethyl starch, and the like. Dextrins may also be used. Examples of farinaceous materials include wheat flour, rye flour, corn (maize) flour, and the like.

In the foregoing disclosure, and in the following claims, we employ the term "starch" in reference to the material compacted. We do not intend that the term shall be limited to unmodified starches, but wish it understood that the term as used includes not only various physical forms of starch, but also all chemically modified starches which retain, or have a granule form such as to compact under pressure to a useful degree according to the method herein disclosed and claimed.

We do not intend to limit the application of the broad aspects of the process, nor the use of the means herein disclosed, to starch as above defined, but wish it understood that the same are applicable to compacting a wide variety of pulverulent materials, such as dextrins and polyoses. It is contemplated that the process and means may be applied to compacting other materials capable of compaction, for example, dry feed products, such as gluten feeds, the other dry products, such as protein, zein and the like, and chemical products, such as methyl glucoside and the like.

While we have described a specific embodiment employing rolls of 20 inch diameter 20 inches long, operating at about 20 to 40 r.p.m., and have expressed the pressures applied to the bearings, and hence acting on the starch passing between the rolls in terms of pounds per unit length of the rolls, it is to be understood that this is by way of illustration and not of limitation. Rolls of greater or less diameter and/or length may be employed without departing from the invention. It is difficult to obtain a direct determination of the actual pressures, in absolute terms, applied to the starch in the bite of the rolls. The practical way to arrive at the required pressure is to set the conditions of moisture, temperature, roll spacing and speed at values comparable to those above given for specific operations, such as temperature about 90° to 180° F. and moisture about 10 to 12%, flake thickness of about .15 inch to .20 inch, and roll surface speeds comparable to those of 20 inch rolls operating at about 28–30 r.p.m. with corresponding force feed delivery at pressures great enough to fill the rolls and then adjust the roll pressure to obtain a flake density of from 65 to 95 pounds per cubic foot. Greater pressures are required for greater density and for thicker flake production.

We do not intend to be limited to the specific features of the equipment, the process and the product above disclosed, since they are but exemplifications. The true scope of our invention is to be ascertained from the appended claims.

We claim:

1. In combination, a pair of cooperating rolls mounted with their axes parallel to each other and having a valley between them, means for driving said rolls concurrently in opposite directions to produce a bite, a casing for confining particulate materials in said valley in contact with said rolls, said casing having an inlet, means for introducing particulate material into said casing through said inlet and maintaining said material under pressure during the operation of said rolls, a flat tubular bar mounted in and disposed lengthwise of said valley, and disposed edgewise to the flow of particulate material adapted to contact said particulate material under pressure at points adjacent the bite of said rolls, and means providing an exhaust passageway leading from said tubular bar to the outside of said casing.

2. In combination, a pair of cooperating rolls mounted with their axes parallel to each other and having a valley between them, means for driving said rolls concurrently in opposite directions to produce a bite, a casing for confining particulate material in said valley in contact with said rolls, said casing having an inlet means for the introduction of particulate material into said casing through said inlet, and maintaining said material under pressure during the operation of said rolls, and deaerating means for the material in said valley comprising a flat vane, the plane of which extends substantially between the rolls whereby the particulate material moving toward the bite of the rolls comes in contact with the side walls of said vane, said vane comprising porous metal spaced apart to provide a gas passageway and a duct extending from said passageway to the outside of the casing to evacuate gases forced through said porous side walls.

3. In combination a pair of compacting rolls for compacting powdered starch into a dense flake, a casing for retaining powdered starch and entrained air under pressure in contact wtih the compacting rolls, a porous deaerating vane positioned and supported in said casing adjacent the entry of said starch between the rolls, said vane having an air exhaust connection leading outside said casing and a force feeder for compressing loose starch with entrained air and forcing the same into said casing, said compressed starch and air moving as a stream in contact with the porous vane and into contact with the rolls, said stream in contact with said vane discharging air through said porous vane and exhaust connection whereby to decrease the air content of the starch entering the bite of the compacting rolls, and serving to increase the frictional engagement between the starch and the surface of the rolls.

4. A deaerating member for deaerating a stream of particulate material in which air is entrapped, comprising a flat vane having an internal passageway, a side wall of which vane is formed of porous material, the pores of which extend from the outer surface of said internal passageway, means rigid with the vane for the attachment of supporting means therefor and a tubular connection communicating with said passageway for conducting away gases entering the passageway through said porous wall.

5. In a device of the class described, a pair of plates of porous material, a discontinuous spacing means disposed between and in contact with adjacent surfaces of said porous plates to space them apart, means sealing the edges of the plates to each other to provide an enclosed space, and a tubular gas evacuating connection communicating with said space and mounted at the edges of said plates.

6. The device of claim 5 characterized by a flat reinforcing bar of metal disposed edgewise in engagement with said plates to reinforce said plates in substantially the plane of said screen.

References Cited by the Examiner

UNITED STATES PATENTS

| | | | |
|---|---|---|---|
| 347,790 | 8/86 | Gent | 99—237 |
| 761,878 | 6/04 | Cooley | 100—90 X |
| 1,188,323 | 6/16 | Richardson | 241—57 |
| 2,675,304 | 4/54 | Komarek | 18—9 |
| 2,882,554 | 4/59 | Heck | 18—9 |
| 2,959,900 | 11/60 | Wollett | 100—90 |

MORRIS O. WOLK, *Primary Examiner*.